April 21, 1925.
P. K. WESTCOTT
1,534,754
VEHICLE LANDING APPARATUS
Filed Aug. 8, 1923
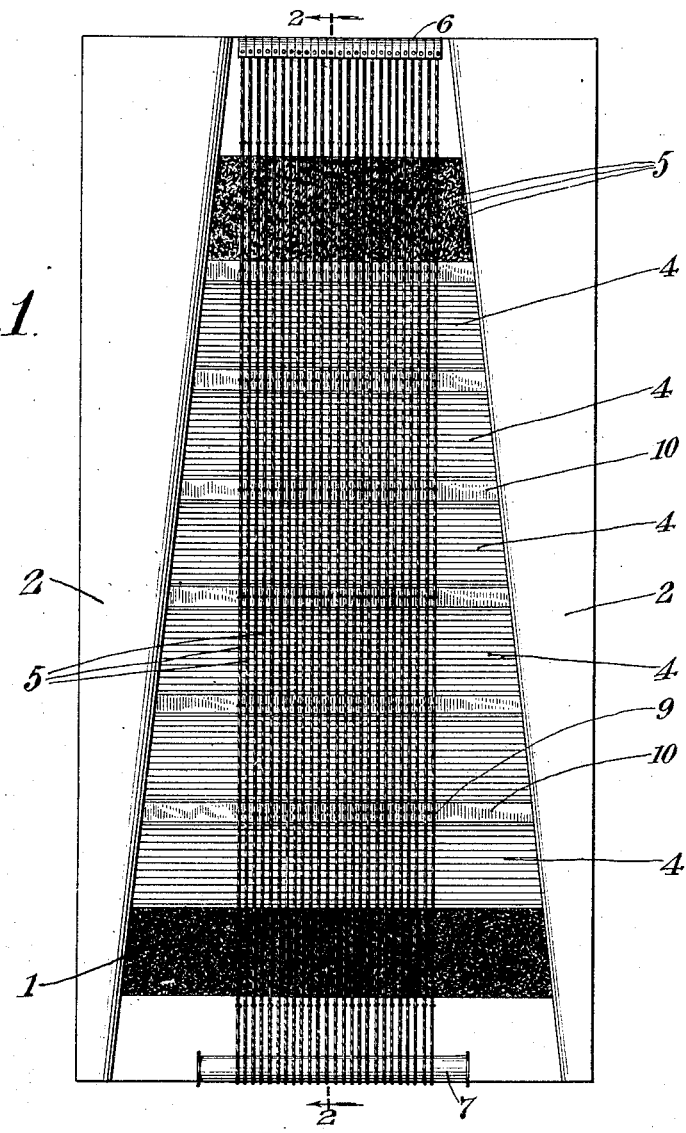
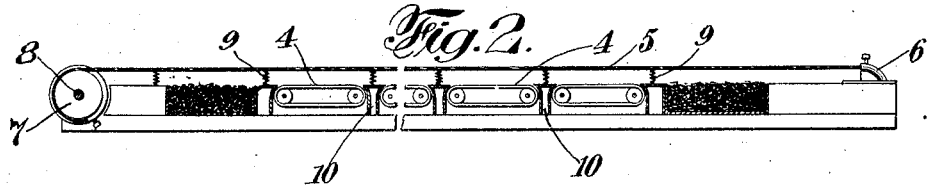
Inventor
Pliny K. Westcott
By his Attorneys
Prindle, Wright, Neal & Bean Patented Apr. 21, 1925.

1,534,754

UNITED STATES PATENT OFFICE.

PLINY K. WESTCOTT, OF BROOKLYN, NEW YORK, ASSIGNOR TO MARY A. KENNEY, OF BROOKLYN, NEW YORK.

VEHICLE-LANDING APPARATUS.

Application filed August 8, 1923. Serial No. 656,314.

*To all whom it may concern:*

Be it known that I, PLINY K. WESTCOTT, a citizen of the United States, a resident of Brooklyn, in the county of Kings and State of New York, have invented certain new and useful Improvements in Vehicle-Landing Apparatus, of which the following is a specification.

The invention relates to landing fields or platforms for airplanes, hydroplanes and the like and has for its primary object the provision of guide members which will assist in directing a vehicle to travel in the desired direction in landing.

Further objects and advantages of the invention will be in part obvious and in part specifically pointed out in the description hereinafter contained which taken in connection with the accompanying drawings discloses a preferred embodiment of the invention. Such embodiment, however, is to be considered as merely illustrative of its principles. In the drawings—

Figure 1 is a plan view of a vehicle landing platform equipped with guides in accordance with the invention, Figure 2 is a longitudinal sectional view taken on line 2—2 of Figure 1.

The invention as illustrated is applied to a vehicle landing and launching platform of the type disclosed in the United States Patent No. 1,437,236, issued to Richard Gibbons on November 28, 1922, and comprises in general a runway 1 onto which the vehicle to be landed will be guided by the operator. If desired, side walls 2, which converge toward the far end of the runway, may be employed in connection therewith and the runway may be provided with a series of traveling webs 4 moving oppositely to the vehicle, all as is described with greater detail in the prior patent above referred to; however, since the specific construction of the platform is not essential to the present invention the platform will not be described in greater detail herein; in fact the invention may be employed in connection with any surface such as the deck of a ship, roof of a building, field, etc., upon which it is desired to land any aerial vehicles.

In accordance with the present invention there is provided over the surface of the runway along which the vehicle passes in landing, a series of spaced parallel guide members between which downwardly extending parts on the vehicle, such as the wheels and tail skid, may pass; or, if desired, special parts may be provided on the vehicle for the purposes above mentioned. A sufficient number of such guide members is provided to enable the vehicle to engage the same without requiring a too careful positioning of the vehicle by the operator at the time it initially engages the guide members and after such initial engagement the guide members act to confine the vehicle to a path of travel lengthwise of the guide members.

In the illustrated embodiment of the invention the guide members above mentioned are constituted by the steel cables 5 strung between supporting brackets 6 at the far end of the runway and suitable supports 7 at the forward end thereof. As illustrated the member 7 consists of a drum mounted upon shaft 8 which latter may be turned in any convenient manner (not shown) to tighten up on the cables when desired.

Thus while the invention is used in connection with traveling webs 4 or other similar means for rapidly checking the speed of an airplane, the guide members 6 permit the wheels, tail skid and similar downwardly projecting parts of the vehicle, to pass between them into contact with the traveling webs, permitting the latter to function properly, and relieving the guides of certain strains and shocks which are taken up by the runway proper. The guide members, however, are supported independently of the traveling webs and thus do not have to travel with the latter.

In the present instance the guide members 6 are yieldingly maintained in position at intermediate points along their lengths as by means of coil springs 9 extending between the same and bridge members 10 between adjacent traveling webs 4.

While a specific embodiment of my invention has been disclosed it will be obvious that many changes may be made therein without departing from its principles as defined in the appended claims.

I claim:

1. A vehicle landing apparatus comprising a runway having a surface adapted to engage a vehicle passing therealong, and a series of slightly spaced parallel guide members supported in position above said runway and extending along the same, said members being adapted to engage downwardly projecting parts on a vehicle to maintain the latter substantially in alignment with the runway.

2. The combination set forth in claim 1 wherein said guide members comprise cables stretched along the runway above the vehicle engaging surface thereof.

3. The combination set forth in claim 1 wherein said guide members comprise cables stretched along the runway above the vehicle engaging surface thereof together with means disposed at intermediate points along the length of the cables for yieldingly holding them in position.

4. A vehicle landing apparatus comprising a runway having thereon a series of traveling webs adapted to engage a vehicle passing thereover, and a series of spaced parallel guide members supported above the traveling webs by stationary parts of the apparatus and adapted to engage downwardly directing parts on a vehicle to maintain the latter substantially in alignment with the webs.

5. The combination set forth in claim 4 together with means disposed between adjacent traveling webs for holding the guiding members in position at intermediate points along their lengths.

6. A vehicle landing apparatus comprising a runway having a surface adapted to engage a vehicle passing there along, and yieldably supported spaced parallel guide members supported in position above said runway and extending along the same, said members being adapted to engage downwardly projecting parts on a vehicle to maintain the latter substantially in alignment with the runway.

In testimony that I claim the foregoing, I have hereunto set my hand this 27th day of July, 1923.

PLINY K. WESTCOTT